United States Patent
Tylicki et al.

(10) Patent No.: US 10,527,242 B1
(45) Date of Patent: Jan. 7, 2020

(54) BATTERY BACKUP FOR LIGHTING SYSTEM

(71) Applicant: HeathCo, LLC, Bowling Green, KY (US)

(72) Inventors: Scott Blaise Tylicki, Bowling Green, KY (US); Muhamed Suljic, Bowling Green, KY (US); Amer Salihovic, Bowling Green, KY (US)

(73) Assignee: HEATHCO, LLC, Bowling Green, KY (US)

( * ) Notice: Subject to any disclaimer, the term of this patent is extended or adjusted under 35 U.S.C. 154(b) by 0 days.

(21) Appl. No.: 16/431,260

(22) Filed: Jun. 4, 2019

Related U.S. Application Data (63) Continuation of application No. 16/118,044, filed on Aug. 30, 2018.
(Continued)

(51) Int. Cl.
*H05B 33/08* (2006.01)
*F21S 9/02* (2006.01)
*H02J 9/06* (2006.01)

(52) U.S. Cl.
CPC .............. *F21S 9/022* (2013.01); *H02J 9/065* (2013.01); *H05B 33/0818* (2013.01); *H05B 33/0857* (2013.01)

(58) Field of Classification Search
CPC ...... F21S 9/00; F21S 9/02; F21S 9/024; H02J 9/00; H02J 9/04; H02J 9/06; H02J 9/062; H02J 9/065; H05B 33/02; H05B 33/08; H05B 33/0842; H05B 33/0845; H05B 33/0854; H05B 33/0872
See application file for complete search history.

(56) References Cited

U.S. PATENT DOCUMENTS 3,976,986 A 8/1976 Zabroski
4,150,302 A 4/1979 Roche
(Continued)

FOREIGN PATENT DOCUMENTS

EP 0805935 A1 11/1997
EP 1397612 A1 3/2004
(Continued)

OTHER PUBLICATIONS

Navilite Exit and Emergency Lighting "Exit and Emergency Lighting" www.junolightinggroup.com, Retrieved on Jul. 27, 2016.
(Continued)

*Primary Examiner* — Jason Crawford
(74) *Attorney, Agent, or Firm* — Middleton Reutlinger (57) ABSTRACT

The described embodiments relate to systems, methods, and apparatuses for providing a lighting system that includes backup light emitting diodes (LEDs) that are incorporated into a primary array of LEDs of the lighting system. The backup LEDs can be illuminated when a utility power source for the lighting system becomes unavailable. The backup LEDs can operate from a backup power supply, which can be charged from the utility power source, when the utility power source is available. Furthermore, charging of the backup power supply can be temperature dependent, in order that the backup power supply and/or the charging circuit can be protected from damage caused by operating such components out of an operating specification.

9 Claims, 6 Drawing Sheets

Related U.S. Application Data (60) Provisional application No. 62/553,457, filed on Sep. 1, 2017.

(56) References Cited

U.S. PATENT DOCUMENTS

| | | | |
|---|---|---|---|
| 4,199,754 A | 4/1980 | Johnson et al. |
| 4,410,930 A | 10/1983 | Yachabach |
| 4,571,531 A | 2/1986 | Lin |
| 4,682,147 A | 7/1987 | Bowman |
| 5,365,145 A | 11/1994 | Fields |
| 5,366,145 A | 11/1994 | Fields |
| 5,426,347 A | 6/1995 | Nilssen |
| 5,661,645 A | 8/1997 | Hochstein |
| 5,747,937 A | 5/1998 | Wiesemann et al. |
| 5,966,069 A | 10/1999 | Zmurk et al. |
| 6,010,228 A | 1/2000 | Blackman et al. |
| 6,392,563 B1 | 5/2002 | Paquette et al. |
| 6,533,438 B2 | 3/2003 | Ter-Hovhannisian |
| 6,741,324 B1 | 5/2004 | Kim |
| 6,933,678 B2 | 8/2005 | Kuo |
| 6,986,589 B2 | 1/2006 | Evans et al. |
| 7,034,506 B2 | 4/2006 | Chen et al. |
| 7,188,967 B2 | 3/2007 | Dalton et al. |
| 7,391,159 B2 | 6/2008 | Harwood |
| 7,400,226 B2 | 7/2008 | Barrieau et al. |
| 7,501,768 B2 | 3/2009 | Lane et al. |
| 7,507,001 B2 | 3/2009 | Kit |
| 7,520,072 B2 | 4/2009 | Yu |
| 7,520,631 B2 | 4/2009 | Dalton et al. |
| 7,649,472 B1 | 1/2010 | Paterno |
| 7,737,640 B2 | 6/2010 | Marques et al. |
| 7,771,087 B2 * | 8/2010 | Wilcox | F21S 8/086 362/294 |
| 7,804,252 B2 | 9/2010 | Chen |
| 7,891,832 B2 | 2/2011 | Allsop et al. |
| 7,915,829 B2 | 3/2011 | Keller et al. |
| 8,029,151 B2 * | 10/2011 | Butler | F21S 8/086 362/20 |
| 8,047,682 B2 | 11/2011 | Zheng et al. |
| 8,066,391 B2 | 11/2011 | Zhong |
| 8,253,347 B2 | 8/2012 | Fiermuga |
| 8,273,574 B2 | 10/2012 | Scoggins, Jr. et al. |
| 8,299,712 B2 | 10/2012 | Smith, III et al. |
| 8,299,717 B2 | 10/2012 | Chuang |
| 8,333,481 B2 * | 12/2012 | Deng | H05B 37/04 315/86 |
| 8,388,170 B2 | 3/2013 | Hetrick et al. |
| 8,491,152 B2 | 7/2013 | Dalton et al. |
| 8,491,159 B2 | 7/2013 | Recker et al. |
| 8,519,626 B2 | 8/2013 | Leshniak |
| 8,558,407 B2 | 10/2013 | Mandy et al. |
| 8,558,458 B2 | 10/2013 | Bae et al. |
| 8,575,787 B2 * | 11/2013 | Stocker | H02J 9/065 307/150 |
| 8,588,830 B2 | 11/2013 | Myer et al. |
| 8,614,549 B2 | 12/2013 | Chang et al. |
| 8,629,620 B2 | 1/2014 | Yen et al. |
| 8,702,256 B2 | 4/2014 | Alkjaer |
| 8,723,434 B2 | 5/2014 | Watson et al. |
| 8,796,946 B2 | 8/2014 | Rohner et al. |
| 8,823,272 B2 | 9/2014 | Trainor et al. |
| 8,858,006 B2 | 10/2014 | Lee |
| 8,866,392 B2 | 10/2014 | Chen |
| 8,902,076 B2 | 12/2014 | Pederson et al. |
| 9,048,685 B2 | 6/2015 | Huang et al. |
| 9,055,642 B2 | 6/2015 | Maa et al. |
| 9,089,016 B2 | 7/2015 | Recker et al. |
| 9,107,269 B2 | 8/2015 | Martin et al. |
| 9,212,812 B2 | 12/2015 | Kinnune et al. |
| 9,252,632 B2 | 2/2016 | Lewis |
| 9,270,143 B1 | 2/2016 | Mangiaracina et al. |
| 9,386,638 B2 | 7/2016 | Trinschek et al. |
| 9,398,649 B2 | 7/2016 | Wang |
| 9,414,469 B2 | 8/2016 | Chen et al. |
| 9,420,661 B2 | 8/2016 | Martzall |
| 9,468,046 B2 | 10/2016 | Barnetson et al. |
| 9,472,955 B2 | 10/2016 | Jones et al. |
| 9,485,834 B2 | 11/2016 | Noguchi |
| 9,526,151 B2 | 12/2016 | Kreiner et al. |
| 9,528,692 B2 | 12/2016 | Kohn |
| 9,560,719 B2 | 1/2017 | Chen |
| 9,574,725 B2 | 2/2017 | Pellenc |
| 9,839,088 B1 * | 12/2017 | Deaton | F21S 9/022 |
| 2006/0262522 A1 | 11/2006 | Allsop et al. |
| 2007/0014105 A1 | 1/2007 | Noguchi et al. |
| 2007/0189001 A1 | 8/2007 | Nielson et al. |
| 2009/0147505 A1 | 6/2009 | Robinett |
| 2010/0320913 A1 | 12/2010 | Wu et al. |
| 2011/0193482 A1 * | 8/2011 | Jones | H05B 37/04 315/87 |
| 2012/0033400 A1 | 2/2012 | Remus et al. |
| 2012/0104858 A1 | 5/2012 | Noe |
| 2012/0126699 A1 | 5/2012 | Zittel |
| 2012/0326614 A1 | 12/2012 | Tsuji et al. |
| 2013/0147269 A1 | 6/2013 | Zimmermann et al. |
| 2013/0343043 A1 | 12/2013 | Yu |
| 2014/0085861 A1 * | 3/2014 | Nicolai | F21V 13/04 362/84 |
| 2014/0145623 A1 | 5/2014 | McCullough et al. |
| 2014/0159599 A1 | 6/2014 | Tetik et al. |
| 2014/0240966 A1 * | 8/2014 | Garcia | H02J 7/0086 362/183 |
| 2014/0246911 A1 | 9/2014 | Stocker |
| 2014/0313703 A1 | 10/2014 | Guenther et al. |
| 2014/0354150 A1 * | 12/2014 | Joseph | H05B 33/0872 315/51 |
| 2015/0015076 A1 | 1/2015 | Park |
| 2015/0028750 A1 | 1/2015 | Chen |
| 2015/0048685 A1 | 2/2015 | Wilson |
| 2015/0326117 A1 * | 11/2015 | Tischler | H05B 33/0815 315/185 R |
| 2015/0340907 A1 | 11/2015 | Lei |
| 2016/0120000 A1 | 4/2016 | Chen |
| 2016/0156220 A1 | 6/2016 | Kaag |
| 2016/0312968 A1 | 10/2016 | Brunelli et al. |
| 2016/0330811 A1 | 11/2016 | Wang |
| 2016/0330818 A1 | 11/2016 | Chen |
| 2016/0330824 A1 | 11/2016 | Recker et al. |
| 2017/0094743 A1 | 3/2017 | Chen |

FOREIGN PATENT DOCUMENTS

| | | |
|---|---|---|
| EP | 1979669 A2 | 10/2008 |
| EP | 2149009 A1 | 2/2010 |
| EP | 2839720 A1 | 2/2015 |
| EP | 2942852 A1 | 11/2015 |
| EP | 2820920 B1 | 6/2016 |

OTHER PUBLICATIONS

Litom "Litom Solar Powered Wireless 8 LED Security Motion Sensor Lamp Outdoor Light" www.amazon.com. Retrieved on Jul. 27, 2016.

* cited by examiner

```
┌─────────────────────────────────────────────────────────────┐
│ CAUSING A SUPPLY SIGNAL TO BE PROVIDED TO A FIRST SET OF LEDS│
│ AND A SECOND SET OF LEDS OF A LIGHTING DEVICE, THE FIRST SET OF│
│ LEDS INCLUDING BACKUP LEDS THAT ARE CONNECTED TO A BACKUP   │
│              BATTERY OF THE LIGHTING DEVICE                 │
│                           402                               │
└─────────────────────────────────────────────────────────────┘
                              │
                              ▼
┌─────────────────────────────────────────────────────────────┐
│ DETERMINING THAT A POWER SOURCE FOR THE SUPPLY SIGNAL IS AT │
│                 LEAST TEMPORARILY UNAVAILABLE               │
│                           404                               │
└─────────────────────────────────────────────────────────────┘
                              │
                              ▼
┌─────────────────────────────────────────────────────────────┐
│   CAUSING THE BACKUP BATTERY TO PROVIDE A BACKUP SUPPLY     │
│  SIGNAL TO THE BACKUP LEDS OF THE FIRST SET OF LEDS, WHILE  │
│        BYPASSING OTHER LEDS OF THE FIRST SET OF LEDS        │
│                           406                               │
└─────────────────────────────────────────────────────────────┘
```

BATTERY BACKUP FOR LIGHTING SYSTEM

TECHNICAL FIELD

The embodiments described herein generally relate to lighting systems. Specifically, the embodiments set forth provide lighting systems that include backup LEDs that are part of an array of LEDs that are also used during a normal operation of the lighting system.

BACKGROUND

Lighting systems can be exposed to a variety of environmental conditions that can affect operations of the lighting systems. For instance, lighting systems that operate in extreme temperatures can occasionally malfunction as a result of changes in conductivity of different components within the lighting system. Furthermore, environmental conditions can also affect external features that support the functionality of the lighting systems. Such external features can include utility power systems, which can be susceptible to outages caused by weather and other environmental conditions. If a lighting system is not designed to handle such outages, the lighting system can cease operations, or at least operate inefficiently during outages.

SUMMARY

The described embodiments relate to systems, methods, and apparatus for providing a backup battery mode for a lighting device. In some implementations, a method implemented by one or more processors is set forth. The method can include causing a supply signal to be provided to a first set of light emitting diodes (LEDs) and a second set of LEDs of a lighting device. A subset of the first set of LEDs can correspond to backup LEDs that are connected to a backup battery of the lighting device. The method can also include determining that a power source for the supply signal is at least temporarily unavailable. The power source can be connected to the backup LEDs at a node to which the backup battery is connected. The method can further include causing the backup battery to provide a backup supply signal to the backup LEDs of the first set of LEDs. The backup supply signal can bypass LEDs of the first set of LEDs that are excluded from the backup LEDs, at least based on an arrangement of the backup LEDs. In some implementations, the method can also include determining that an ambient temperature at a location of the lighting device is outside of an operating temperature range for the backup battery, and causing the backup battery to provide less electrical current to the backup LEDs in response to the ambient temperature being outside of the operating temperature range for the backup battery. In other implementations, the method can include, subsequent to the backup battery providing the backup supply signal to the backup LEDs, determining that the power source is available for providing power to the lighting device, and determining that an ambient temperature at a location of the lighting device is within an operating temperature range of backup battery charging circuit of the lighting device, and causing the power source to charge the backup battery. Furthermore, the method can include causing the power source to provide power to the first set of LEDs and the second set of LEDs while also charging the backup battery. The first set of LEDs operate at a different color temperature than the second set of LEDs. A portion of the first set of LEDs that excludes the backup LEDs can include more resistors than a separate portion of the first set of LEDs corresponding to the backup LEDs. The LEDs of the first set of LEDs that are excluded from the backup LEDs are arranged to direct the supply signal from to the backup LEDs.

In yet other embodiments, a system is set forth as including a first set of LEDs that includes backup LEDs arranged as a subset of the first set of LEDs, and a second set of LEDs that is separately controllable from the first set of LEDs. The system can also include one or more sensors configured to provide sensor data associated with an operating environment of the first set of LEDs and the second set of LEDs, and a backup power supply configured to provide a backup supply signal to the backup LEDS. The backup power supply can be connected to the first set of LEDs in an arrangement that is configured to electrically isolate the backup supply signal from LEDs that are excluded from the backup LEDs in the first set of LEDs. The system can also include a controller connected to the sensor, the first set of LEDs, and the second set of LEDs. The controller can be configured to cause the backup power supply to receive a charge signal when the sensor data is within an operating threshold of the backup power supply and throttle the charge signal when the sensor data is outside of the operating threshold. The sensor data can correspond to a temperature of the backup power supply or an environment of the backup power supply. Furthermore, the one or more sensor can include a motion sensor configured to be responsive to motion near the first set of LEDs or the second set of LEDs. In some implementations, the controller is further configured to: (i) cause the first set of LEDs to operate from a utility power source when an amount of motion detected by the motion sensor is within a motion threshold, and (ii) cause both the first set of LEDs and the second set of LEDs to operate from the utility power source when the amount of motion detected by the motion sensor is outside of the motion threshold. The backup supply signal and a utility supply signal from the utility power source can be received by the backup LEDs at a common node of the first set of LEDs. A resistance of a portion of the first set of LEDs corresponding to the backup LEDs can be less than a separate resistance of separate portion of the first set of LEDs.

In yet other implementations, a non-transitory computer readable medium is set forth as storing instructions that, when executed by one or more processors, cause the one or more processors to perform steps that include causing a first set of LEDs of a lighting device to operate based on a first pulse width modulated (PWM) signal generated at the lighting device. The steps can also include determining, based on sensor data provided by one or more sensors of the lighting device, that a motion event has occurred proximate to the lighting device, and causing a second set of LEDs of the lighting device to operate in response to the motion event, wherein the second set of LEDs are operated according to a second PWM signal that is different than the first PWM signal. The steps can further include determining that a utility power signal, from which the first PWM signal and the second PWM signal are generated, is temporarily unavailable, and causing backup LEDs, which are a subset of the first set of LEDs, to operate from a backup battery that is configured to provide current for a third PWM signal, which operates according to a duty cycle at which the first PWM signal operates. The duty cycle at which the first PWM signal and the third PWM signal operates is an inverse of a different duty cycle at which second PWM signal operates. In some implementations, the first set of LEDs and the second set of LEDs are concurrently illuminated in response to the detection of the motion event. Furthermore, the backup LEDs can be exclusively illuminated in response to the determination that the utility power signal is temporarily unavailable. The second set of LEDs can provide a higher color temperature output than the first set of LEDs. In some implementations, the one or more sensors can include a temperature sensor and the steps can further include: determining that the utility power signal is available, determining that an operating temperature of a charging circuit for the backup battery is within a temperature threshold accessible to the one or more processors, and causing the charging circuit to provide a charging signal to the battery. The utility power signal can be determined to be available within a threshold time period from the motion event, and the steps can further include: causing the first set of LEDs and the second set of LEDs to be illuminated simultaneously from the utility power signal.

For purposes of the instant specification the term "security lighting system" or "lighting system" is used herein to refer to an implementation or arrangement of one or more linked lighting units in a particular form factor, assembly, or package. The term "security light" or "lighting unit" is used herein to refer to an apparatus including one or more light sources of same or different types. A given lighting unit can have any one of a variety of mounting arrangements for the light source(s), enclosure/housing arrangements and shapes, and/or electrical and mechanical connection configurations. Additionally, a given unit optionally can be associated with (e.g., include, be coupled to and/or packaged together with) various other components (e.g., control circuitry) relating to the operation of the light source(s).

Additionally the term "controller" is used herein generally to describe various apparatus relating to the operation of one or more light sources. A controller can be implemented in numerous ways (e.g., such as with dedicated hardware) to perform various functions discussed herein. A "processor" is one example of a controller, which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

The described embodiments relate to systems, methods, and apparatuses for controlling lights in a security lighting system according to whether grid power is available to the security lighting system. A security light can illuminate in response to a variety of stimulus in order to illuminate areas of interest when certain actions are occurring at those areas. An example of such stimulus can include motion or changes in ambient light. Unfortunately, should a power outage occur, many security lights would no longer be able to sense such stimulus and provide power to their lights. Moreover, in the event that a light of a security lighting device malfunctions, the security light may not have any backup for providing light in case of an emergency. However, the present disclosure provides security lighting systems with a backup battery and a backup array of light emitting diodes (LEDs), along with circuitry for preserving the backup battery, and controlling when the backup array of LEDs will be active.

The security lighting system provided herein can be powered by an alternating current (AC) power source, such as a utility power source, when operating in a normal power mode. Additionally, the security lighting system can be powered by a direct current (DC) power source, such as a backup battery power source, when operating in a backup power mode. The security lighting system can include an LED array with a first set of LEDs that can be powered by the AC power source during the normal power mode. Furthermore, a second set of LEDs of the LED array can be powered by the DC power source during the backup power mode. The security lighting system can include a controller that is connected to a motion sensor and/or an ambient light sensor of the security lighting system. Signals from the motion sensor and/or the ambient light sensor can be used by the controller to control the first set of LEDs and the second set of LEDs. Additionally, the controller can modify the operations of the first set of LEDs and the second set of LEDs according to whether the security lighting system is operating in the normal power mode or the backup power mode.

When operating in the backup power mode, the second set of LEDs can illuminate in response to signals from a motion sensor and/or ambient light sensor, and the illumination time can be limited to conserve battery power. The second set of LEDs can illuminate as long as motion is sensed and/or as long as an amount of ambient light detected is outside of a threshold. In some embodiments, the first set of LEDs and the second set of LEDs can include at least some of the same LEDs. In other words, some LEDs that are used during the normal power mode can also be used during the backup power mode. In other embodiments, the LEDs operating in the backup power mode can be a subset of the LEDs operating in the normal power mode. In yet other embodiments, the LED array can operate at a first level of luminance in the normal power mode and a second level of luminance, which consumes less energy than the first level of luminance, during the backup power mode.

The second set of LEDs can be reserved for operation during the backup power mode, and/or can be used during a light boost mode. For example, the first set of LEDs can operate at a first level of brightness or color temperature when a first condition is satisfied, and a second level of brightness or color temperature when a second condition is satisfied. Additionally, the second set of LEDs can operate in combination with the first set of LEDs when a third condition is satisfied. Each of the conditions can be satisfied based on the signals that are received from sensors of the security lighting system, a selection made by a user of the security lighting system, and/or any other input or change occurring at the security lighting system.

When the first set of LEDs or the second set of LEDs are operating in a backup power mode, or a dim power mode, adjustments to a color temperature of the first set of LEDs or the second set of LEDs can be limited. Furthermore, adjustments to the color temperature of the first set of LEDs and the second set of LEDs can be made using a PWM signal, and an inverse of the PWM signal. For instance, a color temperature of the first set of LEDs (e.g., 5000K LEDs) can be set according to a PWM signal that is provided to the first set of LEDs. The PWM signal can, for example, have a duty cycle of 70% when operating the first set of LEDs. Furthermore, when operating the second set of LEDs, an inverse of the PWM signal can be used to control the color temperature. Therefore, the duty cycle of the PWM signal to the second set of LEDs can be, for example, 30%.

The security lighting system can include a battery charger for charging the backup battery of the security lighting system. In order to preserve a useful lifetime of the battery, the battery charger can be prevented from charging the battery when an ambient temperature and/or battery temperature measured by the security lighting system is outside of a specified temperature threshold. In some embodiments, at least some of the LEDs in the LED array can be prevented from operating when the ambient temperature and/or battery temperature measured by the security lighting system is outside of a specified temperature threshold. It should be noted that the battery or batteries that operate during the backup battery mode can be rechargeable or non-rechargeable.

The security lighting system can include a driver that receives AC power from a grid power source and converts the AC power into usable power by the LED array. The driver can also provide power to a controller that is connected to one or more sensors and a DC charging circuit for charging the backup battery of the security lighting system. Additionally, the controller can detect when AC power is no longer available to the driver as a result of, for example, an outage, and initialize the backup battery for powering the security lighting system. When the controller determines that AC power is no longer available, the controller can also switch the security lighting system to operating a backup set of LEDs in order to preserve the main LEDs (e.g., the first set of LEDs) of the LED array.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with a security light unit having a housing and having one or more light heads with various illumination sources. However, one or more aspects of the methods and apparatus described herein may be implemented in other units that have alternative configurations. For example, aspects described herein may be implemented in security light units wherein the illumination sources and/or other components are not enclosed in a housing. Also, for example, aspects described herein may be implemented in units wherein power may be provided to one or more of the components of the security light unit through various electrical connections that are not engageable with a standard illumination sources. Implementation of the one or more aspects described herein in alternatively configured environments is contemplated without deviating from the scope or spirit of the claimed invention.

Figure 1:
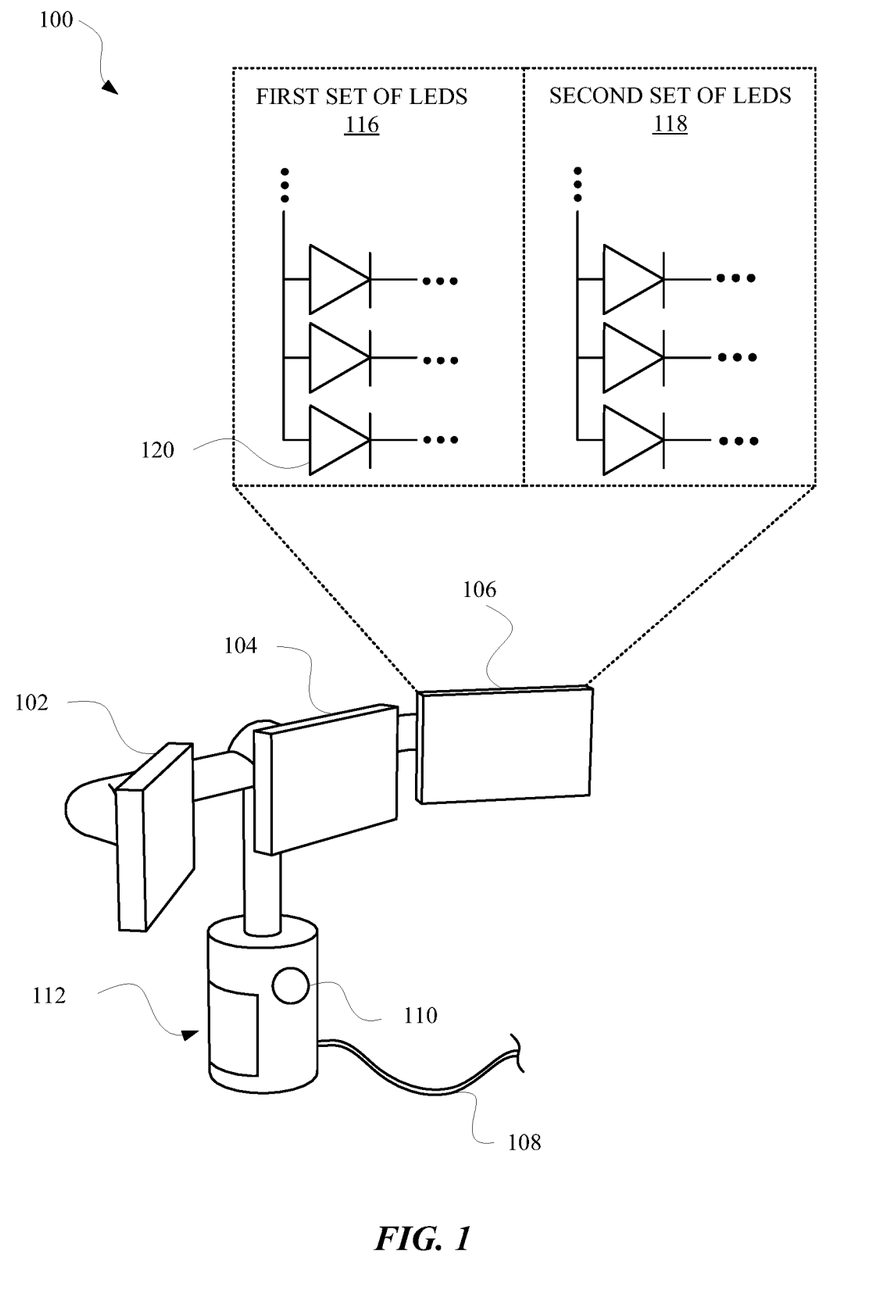
FIG. 1 illustrates a perspective view of a lighting unit that includes multiple sets of LEDs that illuminate according to different operating conditions.

FIG. 1 illustrates a perspective view of a lighting unit 100 that includes multiple sets of LEDs that illuminate according to different operating conditions. The lighting unit 100 can include one or more separate lights (102, 104, and 106) that can be static or maneuverable to provide light in different directions. Each of the lights can include a first set of LEDs 116 and a second set of LEDs 118. The lighting unit 100 can further include one or more sensors 110, which can be a motion sensor and/or an ambient light sensor. Additionally, the lighting unit 100 can include multiple different power sources such as a battery 112 and a utility power source 108, illustrated as a cable that can be connected to utility power. During operation of the lighting unit 100, the power source of the lighting unit 100 can change according to whether utility power is available. For example, when there is an outage of the utility power source 108, the lighting unit 100 can operate using the battery 112. Furthermore, the first set of LEDs 116 and the second set of LEDs 118 can operate independently according to various operating conditions of the lighting unit 100. For example, the first set of LEDs 116 can be a primary set and the second set of LEDs 118 can be a backup set. The second set of LEDs 118 can be powered by the battery 112 when the utility power source 108 is not available as a result of, for example, a power outage. When the utility power source 108 is not available, the battery 112 can also power a controller that is connected to the sensors 110. In this way, the lighting unit 100 can operate in response to signals from the sensors 110 when an outage occurs and limits the availability of the utility power source 108. For example, the controller can cause the second set of LEDs 118 to illuminate using battery power from the battery 112 when an outage occurs and motion is detected by the sensor 110. Furthermore, the controller can include a memory that stores timer values that govern how long the second set of LEDs 118 will illuminate in response to a signal from the sensor 110. In some embodiments, the timer value can be selected by a user in order that the user can decide how long they would like an area to be illuminated in response to motion detection.

In some embodiments, the first set of LEDs 116 and the second set of LEDs 118 can be part of an LED array that can be powered entirely by either the utility power source 108 or the battery 112. For example, during a dim mode of the lighting unit 100, where an ambient light sensor 110 of the lighting unit 100 detects that there is an amount of ambient light outside of a certain threshold, the first set of LEDs 116 of the LED array can be illuminated using the utility power source 108. In some embodiments, the first set of LEDs 116 can consume more power than the second set of LEDs 118, and provide greater illumination than the second set of LEDs 118. Should a power outage occur during the dim mode, the first set of LEDs 116 can be shut off and the second set of LEDs 118 can be illuminated using the battery 112. Furthermore, should motion be detected while the battery is powering the second set of LEDs 118 in the dim mode, the controller can illuminate at least some of the first set of LEDs 116 with the second set of LEDs 118, and/or illuminate the second set of LEDs 118 at a brighter level or different color temperature. However, if there is no outage, the second set of LEDs 118 can be illuminated only in certain modes. For example, the lighting unit 100 can be switched to a light boost mode, which would employ the second set of LEDs 118. During the light boost mode, when the lighting unit 100 is being powered by the utility power source 108, each of the first set of LEDs 116 and the second set of LEDs 118 can be illuminated to their maximum brightness. This provides for a third operating mode, in addition to the dim mode and the dim mode plus motion.

The battery 112 can be charged using a charging circuit that can be powered by the utility power source 108 and/or a renewable power source, such a solar panel located on or near the lighting unit 100. The charging circuit can charge the battery 112 when power is available from the utility power source 108 and the charge of the battery 112 is outside of a charge threshold. Furthermore, the charging circuit can stop charging the battery when the charge of the battery is within the charge threshold or when the utility power source 108 is not available, for example, as a result of an outage. In some embodiments, the sensors 110 can also include a temperature sensor for providing temperature related signals to the controller for controlling the lighting unit 100. The controller can change an operation of the charging circuit according to a temperature measured by the temperature sensor. For example, if an ambient temperature outside the lighting unit 100 and/or an internal temperature of the lighting unit 100 are outside a temperature threshold stored by the controller, the controller can limit an operation of the charging circuit. In other embodiments, if an ambient temperature outside the lighting unit 100 and/or an internal temperature of the lighting unit 100 are outside a temperature threshold stored by the controller, the controller can limit an operation of the LED array. In this way, the charging circuit, battery 112, and/or LED array can be protected from damage that can result from operating at higher temperatures. In some embodiments, the restrictions on operating at certain temperatures can change when the utility power source 108 is not available. For example, when the utility power source 108 is not available and the ambient temperature and/or internal temperature is outside of the temperature threshold, the controller can cause the first set of LEDs 116 and/or the second set of LEDs 118 to be responsive to signals from the sensors 110. In this way, despite there being a power outage, the lighting unit 100 can still illuminate when ambient light is outside of a light threshold and/or motion is detected by a motion sensor.

Figure 2:
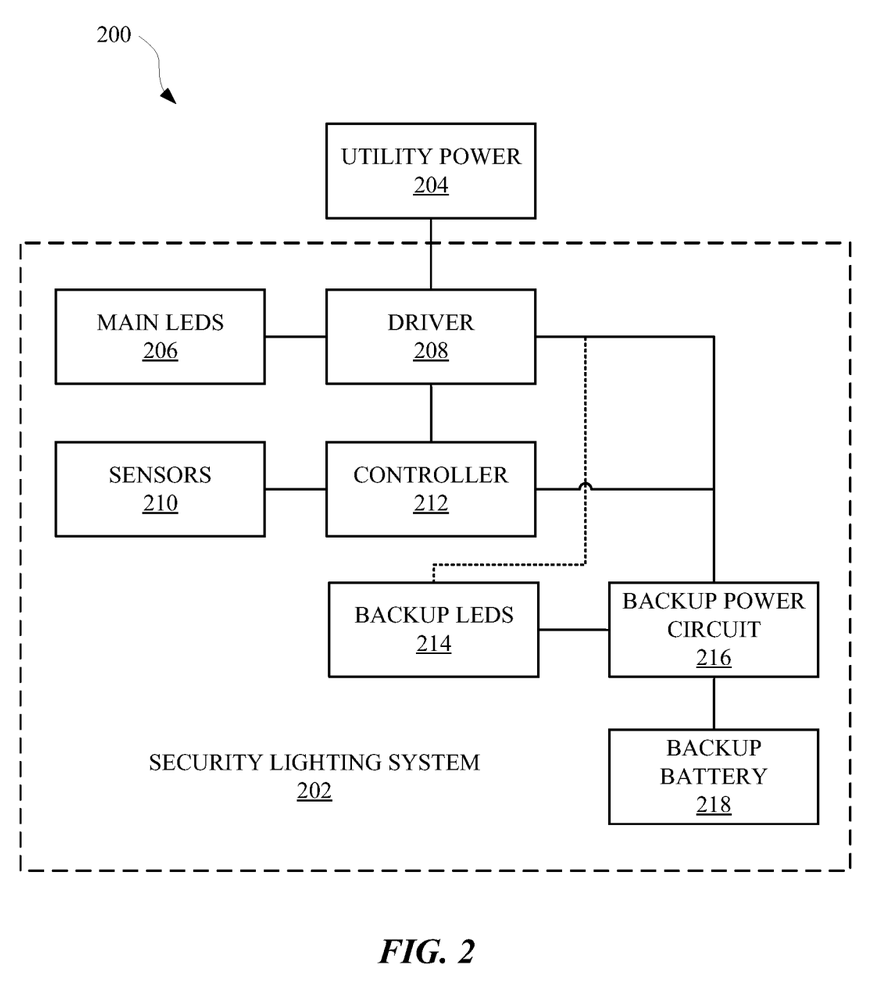
FIG. 2 illustrates a system for operating a security lighting system according to some of the embodiments discussed herein.

FIG. 2 illustrates a system 200 for operating a security lighting system 202 according to some of the embodiments discussed herein. The security lighting system 202 can be powered by utility power 204, such as power from a 120 VAC wall socket, or a backup battery 112, which can be a rechargeable battery or a disposable battery. The security lighting system 202 is capable of switching between these power sources according to certain operating conditions of the security lighting system 202. Furthermore, the security lighting system 202 is capable switching between lights sources according to certain operating conditions of the security lighting system 202. For example, while operating in a normal operating mode, where utility power 204 is available, a driver 208 of the security lighting system 202 can convert the utility power 204 to usable power by main LEDs 206. The main LEDs 206 can be part of an LED array of the security lighting system 202, and the LED array can also include a set of backup LEDs 214. However, in some embodiments, the main LEDs 206 can be a separate LED array from the backup LEDs 214. The main LEDs 206 and the backup LEDs 214 can operate at the same color temperature or different color temperatures. For example, in some embodiments, the main LEDs 206 can include LEDs that operate at a first color temperature (e.g., 3000K) and LEDs that operate at a second color temperature (e.g., 5000K). The first color temperature LEDs of the main LEDs 206 can illuminate during a dim mode of the security lighting system 202, and the second color temperature LEDs can illuminate during a normal operating mode of the security lighting system 202.

The driver 208 can power a controller 212 of the security lighting system 202 from either utility power 204 or the backup battery 218. For example, when a power outage occurs and the utility power 204 is no longer available, the controller 212 can detect that a loss of electrical power from the utility power 204 and switch the driver 208 to the backup battery 218. The controller 212 can also use sensors 210 to determine when to no longer operate a backup power circuit 216 of the security lighting system 202. For example, at least one of the sensors 210 can be a temperature sensor, and the backup power circuit 216 can charge the backup battery 218 using power from the utility power 204. The temperature sensor can measure an ambient sensor outside the security lighting system 202 and/or an internal temperature of the security lighting system 202. If the ambient temperature and/or the internal temperature is outside a temperature threshold stored by the controller 212, the controller 212 can prevent the backup power circuit 216 from charging the battery 218. In this way, the operating lifetime of the battery 218 can be preserved. Temperature measurements can also be used by the controller 212 to limit the operations of the main LEDs 206 and/or the backup LEDs 214. For example, if the ambient temperature and/or the internal temperature are outside of a temperature threshold, the controller 212 can prevent the main LEDs 206 and/or the backup LEDs 214 from receiving power from the utility power 204 or the backup battery 218.

Figure 3:
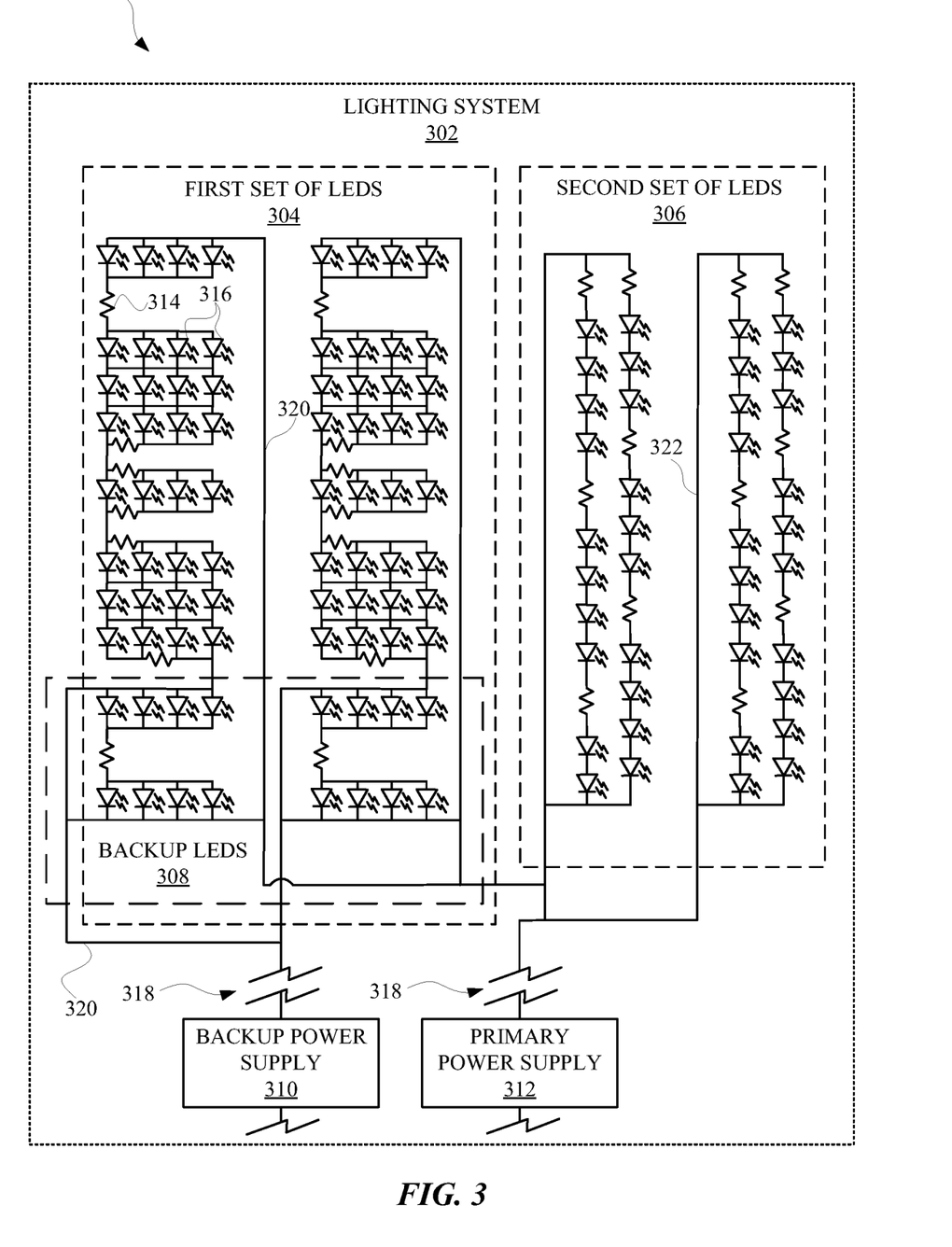
FIG. 3 illustrates a diagram that provides a lighting system that includes backup LEDs that are part of a primary set of LEDs, and can be separately illuminated during a backup power mode of the lighting system.

FIG. 3 illustrates a diagram 300 that provides a lighting system 302 that includes backup LEDs 308 that are part of a primary set of LEDs, and can be separately illuminated during a backup power mode of the lighting system 302. The lighting system 302 can be a security lighting system that can be part of, or include, one or more elements of the security lighting system 202 of FIG. 2. For instance, the lighting system 302 can include a backup power supply 310, which can be a backup battery or any other rechargeable power supply. The lighting system 302 can also include a primary power supply 312, which can be a circuit or connection to a utility power source (e.g., an alternating current (AC) power source). The symbols 318 provided between the backup power supply 310 and backup power connection 320, and the primary power supply 312 and the primary power connection 322, can indicate a direct electrical connection or an electrical connection that includes one or more components that are not illustrated.

The lighting system 302 can operate according multiple different modes, in which a first set of LEDs 304, a second set of LEDs 306, and/or backup LEDs 308 can operate separately, or in combination, depending on the mode governing lighting system 302. For instance, during a normal operating mode of the lighting system 302, the entire first set of LEDs 304 can be illuminated, including the backup LEDs 308. However, in some implementations the first set of LEDs 304, except the backup LEDs 308, can be illuminated during the normal operating mode. When motion is detected by a sensor of the lighting system 302, the backup LEDs 308 can be illuminated with the other LEDs in the first set of LEDs 304. In other implementations, when motion is detected by the sensor, the backup LEDs 308 can be illuminated with the other LEDs in the first set of LEDs 304, as well as the second set of LEDs 306.

In response to motion being detected by one or more sensors of the lighting system 302, a time that is managed by the lighting system 302 can be initialized. The timer can track an amount of time since a most recent motion event was detected by a sensor of the lighting system 302. When the timer reaches or exceeds a motion threshold, the LEDs that were illuminated in response to the motion event can turned off or otherwise not receive a supply signal. The lighting system 302 can access multiple different timers. The timers can be associated with times of day of operation of the lighting system 302, types of motion events detected by the sensor, a mode in which the lighting system 302 is operating, and/or any other characteristic of an operation of the lighting system 302.

The lighting system 302 can include multiple different circuits that embody the first set of LEDs 304, the second set of LEDs 306, and the backup LEDs 308. For instance, the first set of LEDs 304 can include multiple LEDs and resistors 314 for directing a current through the first set of LEDs 304 in a direction of a circuit that includes the backup LEDs 308. The circuit that includes the backup LEDs 308 can also include multiple LEDs and resistors 314 for direct-ing a current from the other LEDs of the first set of LEDs 304 through the LEDs of the backup LEDs 308. A first resistance of a circuit corresponding to the first set of LEDs 304, excluding the backup LEDs 308, can be higher than a second resistance of a circuit corresponding to the backup LEDs 308. Alternatively, the first resistance can be equal to or lower than the second resistance.

In some implementations, a driver or other power converter of the lighting system 302 can provide multiple different pulse width modulated (PWM) signals for powering the first set of LEDs 304, the second set of LEDs 306, and/or the backup LEDs 308. For instance, a first PWM signal can be provided for controlling an output of the first set of LEDs 304 and a second PWM signal can be provided for controlling an output of the second set of LEDs 306. In some implementations, the first PWM signal can operate according to a different duty cycle than the second PWM signal. For instance, a duty cycle of the first PWM signal can be 70%, and the second PWM signal can operate according to a duty cycle of 30%. In other implementations, the duty cycle of the second PWM signal can be an inverse of the first PWM signal. A third PWM signal can be provided for controlling the backup LEDs 308. The third PWM signal can be the same as the first PWM signal or the second PWM signal, or be different than the first PWM signal and the second PWM signal. For instance, the third PWM signal can be the same as the first PWM signal, and also operate according to a duty cycle (e.g., 70%) that is an inverse of a duty cycle (e.g., 30%) of the second PWM signal.

In some implementations, the lighting system 302 can operate according to a full bright mode, in which the first set of LEDs 304 and the second set of LEDs 306 can be illuminated. The full bright mode can exclude illumination of the backup LEDs 308 in order to preserve an operating lifetime of the backup LEDs 308. In some implementations, the lighting system 302 can include a motion sensor and an ambient light sensor. When the ambient light sensor detects an amount of light that is less than an ambient light threshold, the lighting system 302 can operate in a dim mode, in which the first set of LEDs 304 (with or without the backup LEDs 308 being illuminated) are illuminated. When motion is detected at the lighting system 302, the lighting system 302 can operate in the full bright mode in which the first set of LEDs 304 and the second set of LEDs 306 are illuminated (with or without the backup LEDs 308 being illuminated). In some implementations, when motion is detected and ambient light is below the ambient light threshold, the first set of LEDs 304 and the second set of LEDs 306 can be illuminated without the backup LEDs 308 being illuminated.

In some implementations, the lighting system 302 can operate in a backup mode. The lighting system 302 can transition from a different operating mode to the backup mode when a utility power signal is no longer provided to or detected by the lighting system 302. While operating in the backup mode, a battery supply signal from the backup power supply 310 can be provided to the backup LEDs 308 and bypass the other LEDs of the first set of LEDs 304 and the second set of LEDs 306. While operating in the backup mode, the sensors of the lighting system 302 can be operational, in order that the backup LEDs 308 can be illuminated in response to a motion event or a lack of ambient light. For instance, during a power outage, a utility supply signal can be unavailable to the lighting system 302 and, in response, the lighting system 302 can cause the backup power supply 310 to provide power for operating the lighting system 302. The backup power supply 310 can operate a motion sensor of the lighting system 302, and when the motion sensor detects a motion event, the backup power supply 310 can provide a supply signal to the backup LEDs 308 for illuminating the backup LEDs 308 for a period of time. In some implementations, the lighting system 302 can include a temperature sensor that is responsive to temperature changes of the backup power supply 310 (e.g., a battery), a charging circuit, and/or any other portion of the lighting system 302. Furthermore, the lighting system 302 can operate according to a temperature threshold. When a temperature sensed by the temperature sensor is outside of the temperature threshold, the backup power supply 310, the charging circuit, and/or the lighting system 302 can be throttled in order to preserve an operational lifetime of the lighting system 302. For instance, because operating a battery at a high temperature can damage the battery, it can be beneficial to throttle an output of the battery when the temperature reaches a temperature threshold.

The temperature sensor can be used to determine when to throttle a battery charging operation of the lighting system 302. For instance, when the utility power signal is available to the lighting system 302, a battery of the backup power supply 310 can be charged from the utility power signal as long as the temperature of the battery or charging circuit is within a temperature threshold. When the temperature of the battery or charging circuit is outside of the temperature threshold, the battery can be prevented from providing a supply current and/or the charging circuit can be prevented from charging the battery. In this way, an operational lifetime of the battery and the charging circuit can be preserved.

Figure 4:
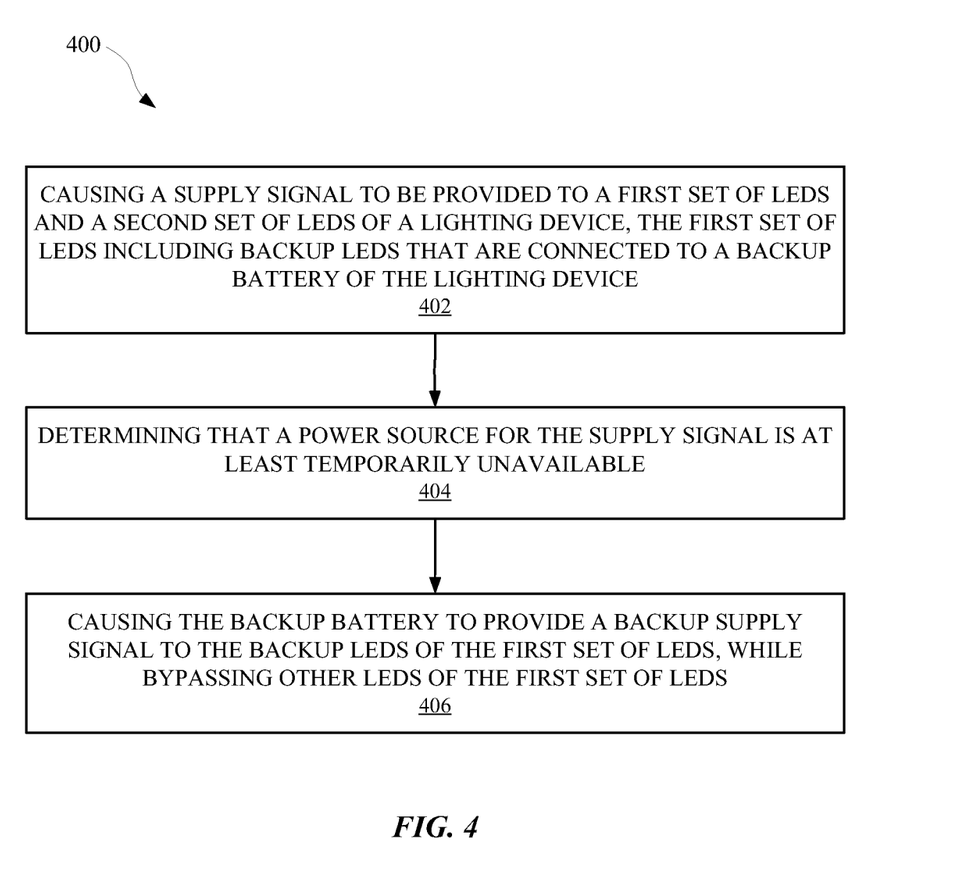
FIG. 4 illustrates a method for operating a lighting system in a backup power mode.

FIG. 4 illustrates a method 400 for operating a lighting system in a backup power mode. The method 400 can be performed by a lighting device, a computing device, and/or any other device capable of controlling a light. The method 400 can include a block 402 of causing a supply signal to be provided to a first set of LEDs and a second set of LEDs of a lighting device. The first set of LEDs can include a set of backup LEDs that are connected to a backup battery of the lighting device. In some implementations, the backup battery can be arranged to provide a backup supply current exclusively to the backup LEDs, as well as any other circuit components that can assist in providing the current the backup LEDs and operating the lighting device.

The method 400 can further include a block 404 of determining that a power source for the supply signal is at least temporarily unavailable. The supply signal can be provided by a utility power source that provides power to various locations in a geographic area. When an outage occurs, the utility power source may not be available to provide power and the lighting device can be responsive to the lack of utility power. For instance, a controller or driver of the lighting device can determine that an amount of current, voltage, and/or power from the utility power source has fallen below a threshold. The lighting device can thereafter modify its operating mode to compensate for the lack of utility power.

The method 400 can also include a step 406 of causing the backup battery to provide a backup supply signal to the backup LEDs of the first set of LEDs, while also causing the backup supply signal to bypass other LEDs of the first set of LEDs that do not include the backup LEDs. The backup supply signal can bypass the other LEDs because of an arrangement of the backup LEDs relative to the other LEDs of the first set of LEDs. For instance, diodes of the first set of LEDs can be arranged such that the backup supply signal is directed away from the other LEDs. In some implementations, a first portion of the first set of LEDs that includes the other LEDs can have a higher resistance than a second portion of the first set of LEDs that includes the backup LEDs. In this way, electrical current will be diverted from the other LEDs to the backup LEDs, at least because of the path of least resistance provided by the backup LEDs.

Figure 5:
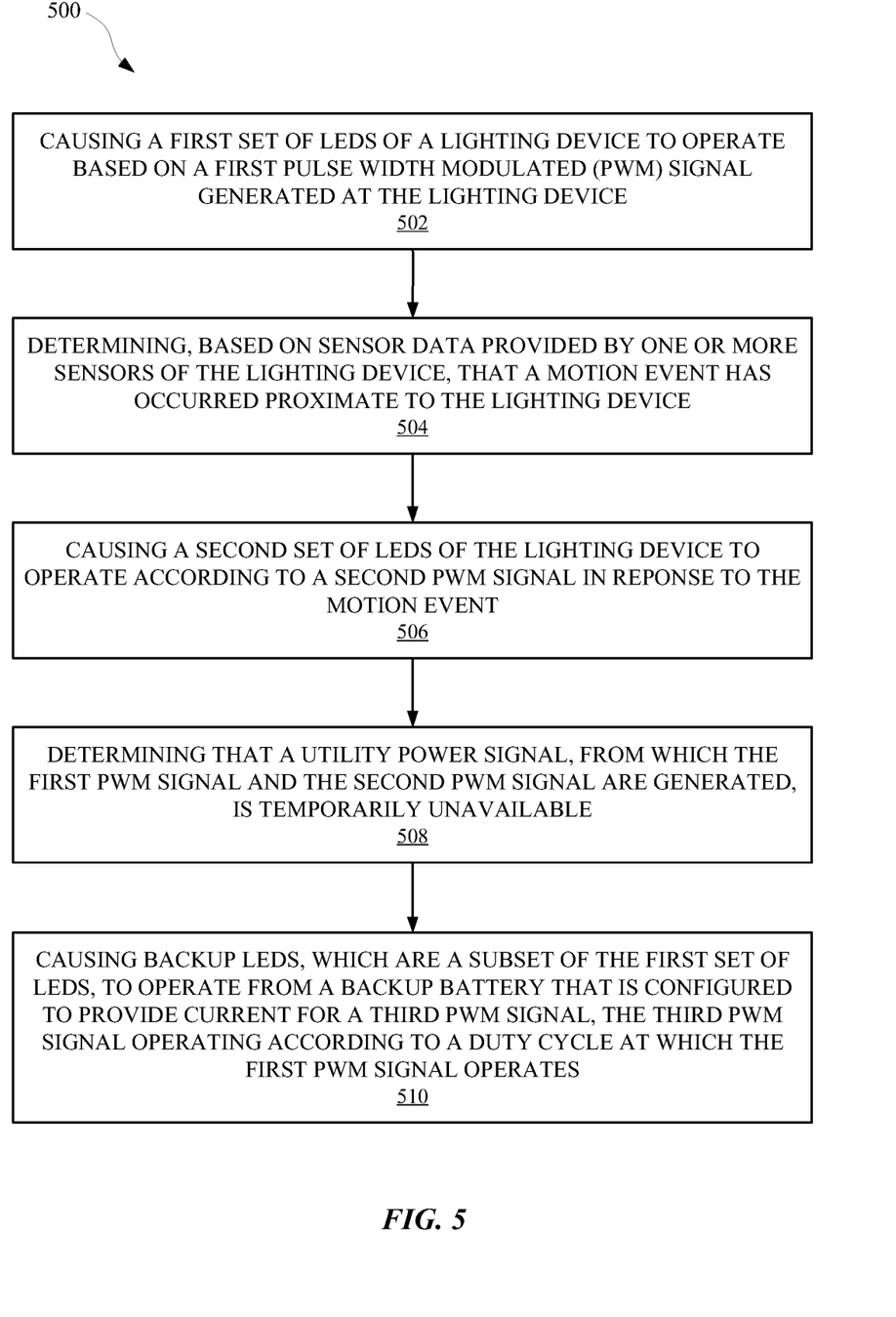
FIG. 5 illustrates a method of operating a lighting system according to different PWM signals.

FIG. 5 illustrates a method 500 of operating a lighting device according to different PWM signals. The method 500 can be performed by a lighting device, a computing device, and/or any other apparatus capable of controlling a light. The method 500 can include a block 502 of causing a first set of LEDs of a lighting device to operate based on a first PWM signal generated at the lighting device. The first PWM signal can operate according to a duty cycle that is set by a controller or a driver of the lighting device. The duty cycle can refer to an amount of time, a ratio, or a percentage that characterizes how much time a signal is in high state compared to an amount of time the signal is in a low state. For instance, if a period of a signal is 1 millisecond, and the signal is high for 0.7 milliseconds, the signal can be characterized as having a duty cycle of 70%.

The method 500 can also include a block 504 of determining, based on sensor data provided by one or more sensors of the lighting device, that a motion event has occurred proximate to the lighting device. The motion event can be, for example, a person walking by the lighting device or an automobile traveling near the lighting device. The sensor data can be powered by a utility power source or a backup power source depending on an availability of the utility power source. Furthermore, the sensor can be a motion sensor, which can include an infrared sensor, image sensor, audio sensor, moisture sensor, temperature sensor, and/or any other sensor capable of being responsive to movements.

The method 500 can further include a block 506 of causing a second set of LEDs of the lighting device to operate according to a second PWM signal in response to the motion event. The second PWM signal can have a duty cycle that is different than a duty cycle of the first PWM signal. For instance, the second PWM signal can have a duty cycle (e.g., 30%) that is an inverse of the first PWM signal (e.g., 70%). In this way, operational instructions for the different sets of LEDs can be more streamlined.

The method 500 can further include a block 508 of determining that a utility power signal, from which the first PWM signal and the second PWM signal are generated, is temporarily unavailable. The utility power signal can be temporarily unavailable as a result of a power outage or other power interruption. The determination can be made in response to a controller or a driver of the lighting device ceasing to receive the utility power signal, or a characteristic of the utility power signal falling within or outside of a predetermined threshold.

The method 500 can also include a block 510 of causing backup LEDs, which are a subset of the first set of LEDs, to operate from a backup battery that is configured to provide current for a third PWM signal. The third PWM signal can operate according to a duty cycle that is the same or substantially similar to the duty cycle at which the first PWM signal operates. In some implementations, the backup LEDs are directly connected to other LEDs of the first set of LEDs, and therefore can operate in a backup mode, a normal mode, a bright mode, and/or a dim mode. However, in other implementations, the backup LEDs can be exclusively reserved for a backup mode in which the backup LEDs are supplied power from a backup power supply.

Figure 6:
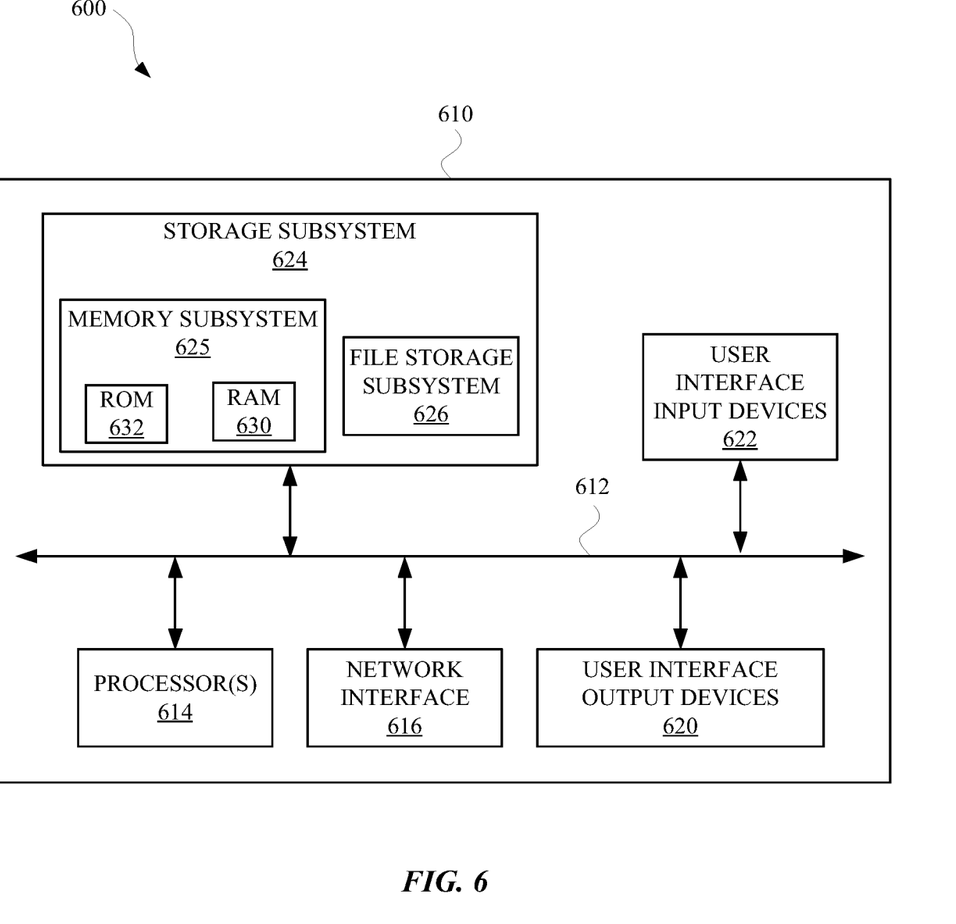
FIG. 6 is a block diagram of an example computer system.

FIG. 6 is a block diagram of an example computer system 610 (i.e., computing device). Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, method 500, method 600, and/or to implement one or more of the lighting unit 100, security lighting system 202, controller 212, driver 208, lighting system 302, and/or any other element discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A method implemented by one or more processors, the method comprising:
   causing a supply signal to be provided to a first set of LEDs and a second set of LEDs of a lighting device, wherein a subset of the first set of LEDs corresponds to backup LEDs that are connected to a backup battery of the lighting device;
   operating the first set of LEDs of the lighting device based on a first pulse width modulated signal generated at the lighting device;
   determining, based on sensor data provided by one or more sensors of the lighting device, that a motion event has occurred proximate to the lighting device;
   operating the second set of LEDs of the lighting device in response to the motion event, wherein the second set of LEDs are operated according to a second PWM signal;
   determining that a power source for the supply signal is at least temporarily unavailable, wherein the power source is connected to the backup LEDs at a node to which the backup battery is connected;
   providing by the backup battery a backup supply signal to the backup LEDs of the first set of LEDs, wherein the backup supply signal bypasses LEDs of the first set of LEDs that are excluded from the backup LEDs and
   operating the backup LEDs from a current for a backup PWM signal which operates according to a duty cycle substantially similar to that which the first PWM signal operates.

2. The method of claim 1, further comprising:
   determining that an ambient temperature at a location of the lighting device is outside of an operating temperature range for the backup battery; and
   causing the backup battery to provide less electrical current to the backup LEDs in response to the ambient temperature being outside of the operating temperature range for the backup battery.

3. The method of claim 1, further comprising:
   subsequent to the backup battery providing the backup supply signal to the backup LEDs, determining that the power source is available for providing power to the lighting device;
   determining that an ambient temperature at a location of the lighting device is within an operating temperature range of backup battery charging circuit of the lighting device; and
   causing the power source to charge the backup battery.

4. The method of claim 3, further comprising:
   causing the power source to provide power to the first set of LEDs and the second set of LEDs while also charging the backup battery.

5. The method of claim 1, wherein the first set of LEDs operate at a different color temperature than the second set of LEDs.

6. The method of claim 1, wherein a portion of the first set of LEDs that excludes the backup LEDs includes more resistors than a separate portion of the first set of LEDs corresponding to the backup LEDs.

7. The method of claim 1, wherein the LEDs of the first set of LEDs that are excluded from the backup LEDs are arranged to direct the supply signal from to the backup LEDs.

8. The method of claim 1 wherein the duty cycle at which the first PWM signal and the backup PWM signal operates is about an inverse of a different duty cycle at which second PWM signal operates.

9. A system, comprising:
   a first set of LEDs, a second set of LEDs, and a backup set of LEDs which are a subset of the first set of LEDs and that are connected to a backup battery of a lighting device;
   a controller operable to:
      operate the first set of LEDs of the lighting device based on a first pulse width modulated signal generated at the lighting device;
      determine, based on sensor data provided by one or more sensors of the lighting device, that a motion event has occurred proximate to the lighting device;
      operate the second set of LEDs of the lighting device in response to the motion event, wherein the second set of LEDs are operated according to a second PWM signal;
      determine that a power source for the supply signal is at least temporarily unavailable, wherein the power source is connected to the backup LEDs at a node to which the backup battery is connected;
      provide by the backup battery a backup supply signal to the backup LEDs of the first set of LEDs, wherein the backup supply signal bypasses LEDs of the first set of LEDs that are excluded from the backup LEDs and operating the backup LEDs from a current for a backup PWM signal which operates according to a duty cycle substantially similar to that which the first PWM signal operates.

* * * * *